US009661829B2

(12) United States Patent
Sternal et al.

(10) Patent No.: US 9,661,829 B2
(45) Date of Patent: May 30, 2017

(54) ANIMAL BALL AND METHOD OF ASSEMBLING

(71) Applicant: CENTRAL GARDEN & PET COMPANY, Walnut Creek, CA (US)

(72) Inventors: Lawrence Sternal, Bartlett, IL (US); Jason Casto, Lombard, IL (US)

(73) Assignee: CENTRAL GARDEN & PET COMPANY, Walnut Creek, CA (US)

(*) Notice: Subject to any disclaimer, the term of this patent is extended or adjusted under 35 U.S.C. 154(b) by 0 days.

(21) Appl. No.: 14/190,867

(22) Filed: Feb. 26, 2014

(65) Prior Publication Data
US 2015/0237830 A1    Aug. 27, 2015

(51) Int. Cl.
A01K 15/02    (2006.01)

(52) U.S. Cl.
CPC ....... A01K 15/027 (2013.01); Y10T 29/49947 (2015.01)

(58) Field of Classification Search
CPC .... A01K 15/02; A01K 15/025; A01K 15/027; F16B 7/20; Y10T 403/7005; Y10T 29/49947
USPC ........ 119/702, 707, 709; 403/326, 329, 344, 403/364; 446/120, 121
See application file for complete search history.

(56) References Cited

U.S. PATENT DOCUMENTS

| 2,975,823 | A |   | 3/1961  | Ponnock          |         |
|-----------|---|---|---------|------------------|---------|
| 4,321,888 | A |   | 3/1982  | Topliffe         |         |
| 5,343,828 | A |   | 9/1994  | Houghton et al.  |         |
| 5,722,348 | A | * | 3/1998  | Phillips et al.  | 119/452 |
| 6,098,571 | A |   | 8/2000  | Axelrod et al.   |         |
| 6,139,396 | A | * | 10/2000 | Lin              | 446/267 |
| 6,237,538 | B1|   | 5/2001  | Tsengas          |         |
| D511,029  | S |   | 10/2005 | Willinger        |         |
| 7,367,283 | B2|   | 5/2008  | Aboujaoude et al.|         |

* cited by examiner

Primary Examiner — Tien Dinh
Assistant Examiner — George Andonyan
(74) Attorney, Agent, or Firm — Grossman, Tucker, Perreault & Pfleger, PLLC

(57) ABSTRACT

The present disclosure relates to an animal ball. The animal ball includes a hollow sphere having a first half and a second half mate-able with said first half. The first half includes a first wall and a first rim and the second half also a second wall and a second rim. In addition, the animal ball includes a mating fastener including a first fastening portion and a second fastening portion. The first fastening portion is connected to the first wall and the second fastening portion is connected to the second wall and the first fastening portion is spaced from the first and second walls.

13 Claims, 8 Drawing Sheets

ANIMAL BALL AND METHOD OF ASSEMBLING

FIELD

The present disclosure is directed to enclosures for rodents or other small mammals in the form of an animal ball and a method of assembling such enclosures.

BACKGROUND

Small rodents, such as hamsters, small rats, gerbils, chinchillas, and mice, are commonly kept as pets. Typically, these animals are kept in cages or other small enclosures, restricting their movement within the confines of the enclosure. Various devices have been developed to provide these animals with exercise, such as by providing an "endless" track in the form of a wheel or by providing a moving enclosure that the rodent may move over a large area, such as the surface of a floor.

A hamster or animal ball is an example of such a moving enclosure which allows rodents, as well as other small mammals, to move around outside of the confines of a cage. A hamster ball is typically formed of two halves that are secured together. An opening is provided with a removable lid for securing the hamster or other rodent in the ball. Movement of the animal around within the ball causes the ball itself to rotate and move around the floor. In addition, a hamster ball may include a series of holes to allow for air circulation. Hamster balls are typically transparent so that the pet owner can observe the condition of the rodent within the ball. Without such a device, if left to move around, the rodent may get away or get into an undesirable place such as inside furniture or walls.

Commonly, snap fits are provided to affix halves of a hamster ball together. However, the snap fits are typically aligned or contiguous with the walls of the hamster ball and if the ball gets crushed, the snap fits may let go. In addition, there is little surface area that is parallel to the mating surfaces of the ball, which may complicate assembly. Further, the features of the snap fits often result in sharp transitions within the ball wall that the rodent must maneuver around or over to move the ball. This may impede the movement of the rodent. In other examples, the hamster ball halves are secured together with screws or by ultrasonic welding. These processes require additional steps and equipment other than just positioning the two ball halves relative to each other. Accordingly, room for improving the design of hamster balls remains.

SUMMARY

An aspect of the present disclosure relates to an animal ball. The animal ball includes a hollow sphere having a first half and a second half mate-able with said first half. The first half includes a first wall and a first rim and the second half also a second wall and a second rim. In addition, the animal ball includes a mating fastener including a first fastening portion and a second fastening portion. The first mating portion is connected to the first wall and the second fastening portion is connected to the second wall and the first fastening portion is spaced from the first and second walls.

Another aspect of the present disclosure relates to a method of assembling an animal ball. The method includes forming a hollow sphere including a first half and a second half mate-able with the first half. The first half includes a first wall and a first rim and the second half includes a second wall and a second rim. The hollow sphere also includes a mating fastener including a first fastening portion and a second fastening portion, wherein the first fastening portion is connected to the first wall and the second fastening portion is connected to the second wall and the first fastening portion is spaced from the first and second walls. The method further includes mating the first half to the second half by fastening the mating fastener.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

The present disclosure is directed to an enclosure for rodents or other small mammals in the form of an animal ball, and particularly to an enclosure where the mating features of the ball halves are spaced away from the wall of the ball. Thus, when the ball is crushed, the snap fits are less prone to let go and release the halves of the ball. In embodiments, the ball includes one or more recesses formed in the exterior surface of each half of the ball with ledges for grasping the ball, which may facilitate mating the ball halves. Further, the mating features may be supported by the ledges providing surfaces to space the mating features from the ball walls. The interior walls of the ball may cover the mating features so that the animal within does not have to step on the mating features.

Figure 1:
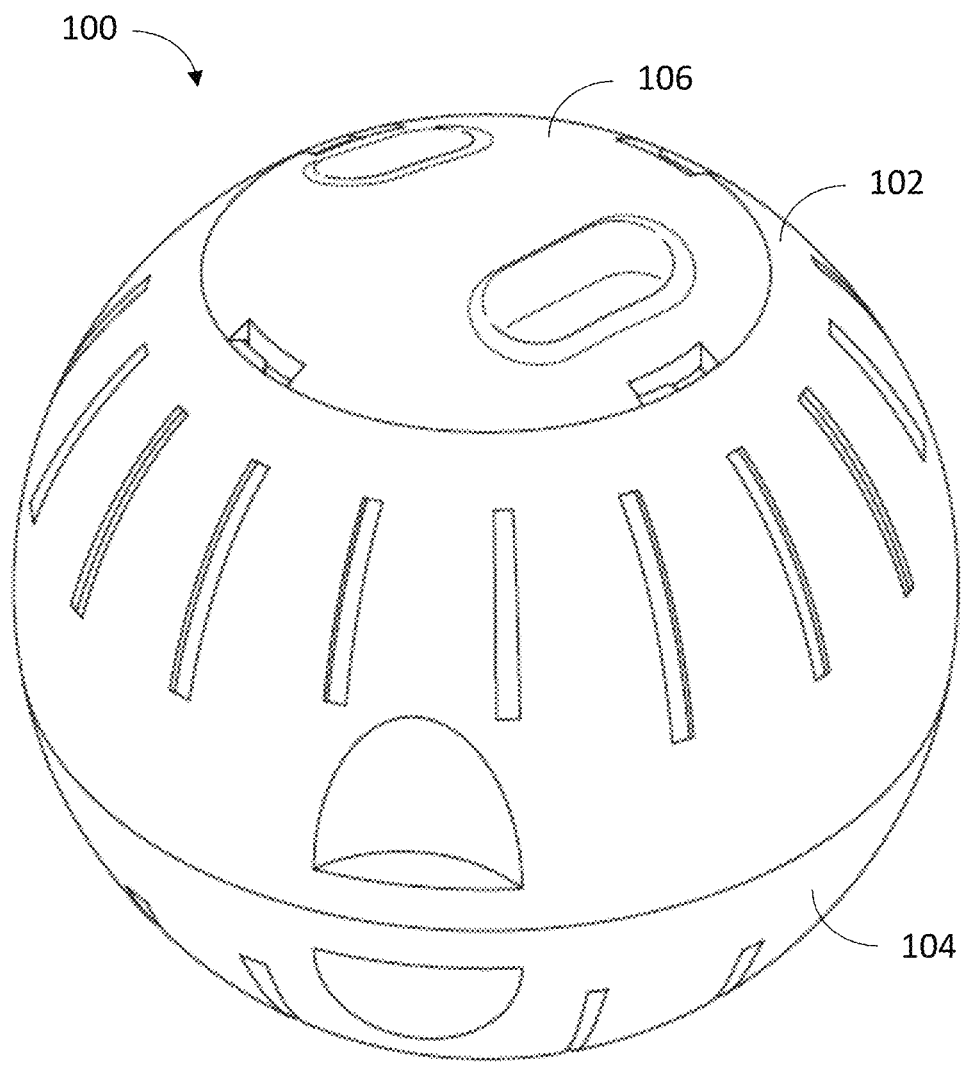
FIG. 1 illustrates a perspective view of an embodiment of an animal ball.
Figure 2:
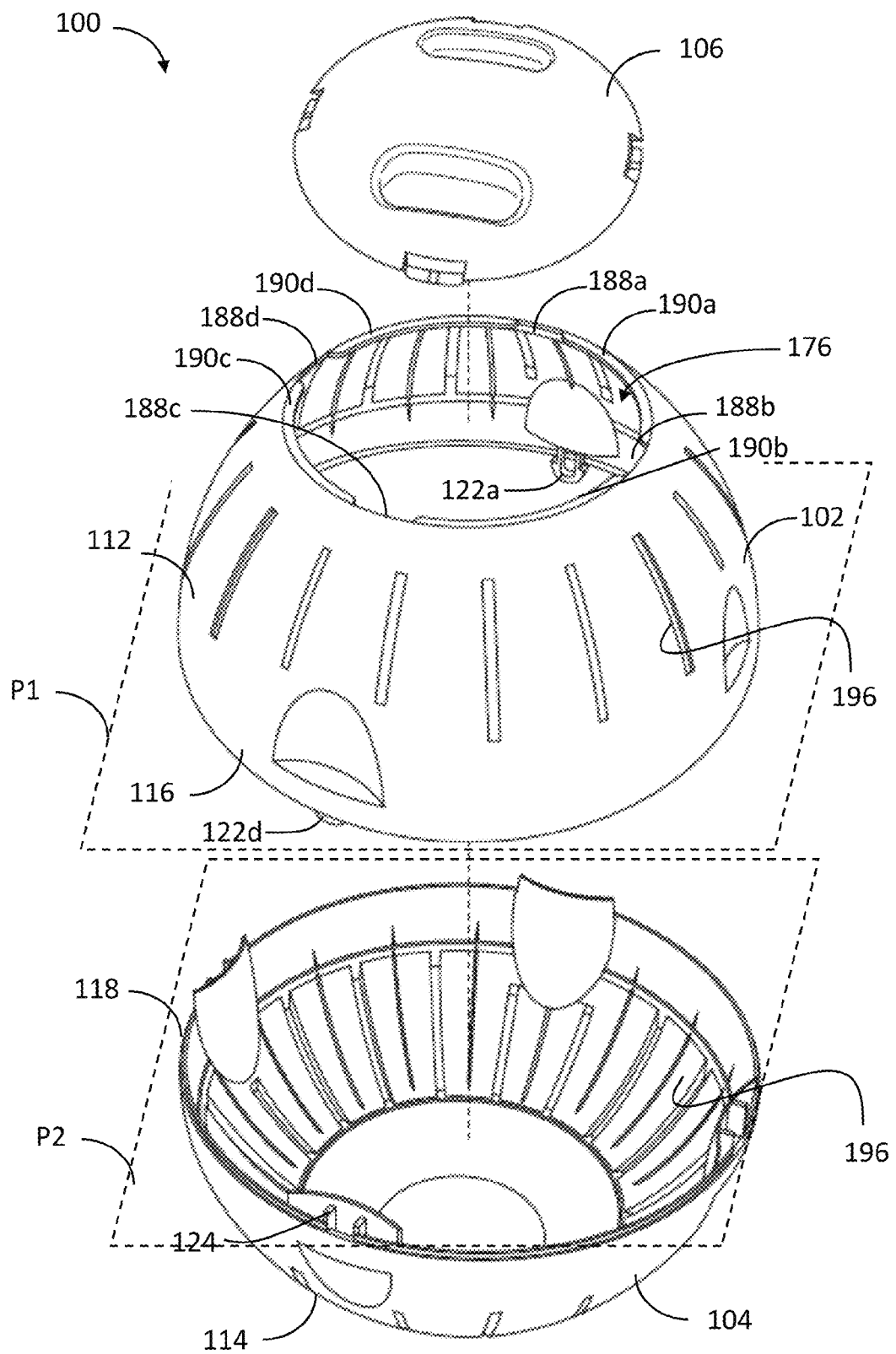
FIG. 2 illustrates an exploded view of an embodiment of an animal ball.

As illustrated in the embodiment of FIGS. 1 and 2, which show an assembled view and an exploded view of the animal ball 100, the animal ball 100 may generally include a first half 102, a second half 104 that is mate-able with the first half 102, and a removable lid 106 that covers an access hole for securing and removing the animal from the animal ball. The overall diameter of the animal ball may be in the range of 4 inches to 20 inches, including all values and ranges therein, such as 5 inches to 15 inches and, preferably, 5 inches to 12 inches. The animal ball may be formed from glass, wood, metal, polymer materials such as acrylic, polycarbonate, polyethylene terephthalate or polystyrene, or a combination of these materials. For example, the first half 102 may be formed from a polymer material and the second half 104 may be formed from metal or wood, or vice versa.

Preferred materials include polymer materials that may exhibit relatively lower brittleness than glass and one or more of the following properties: a Young's modulus in the range of 1.0 to 4.0 GPa, including all values and ranges therein, such as 2.0 GPa to 3.0 GPa; a tensile strength in the range of 40 MPa to 90 MPa, including all values and ranges therein; and an elongation at break in the range of 3% to 150%, including all values and ranges therein and preferably in the range of 100% to 150%, wherein these properties are measured according to ASTM Standard D638-10. Furthermore, preferred materials are transparent, wherein at least 50% of incident light is transmitted through a wall of the ball, allowing for the general condition of the animal within the ball to be determined from viewing the ball. In utilizing a polymer material, the various portions of the animal ball, i.e., the lid, first half and second half, may be formed by injection molding. Other molding techniques may be used as well such as thermoforming, vacuum forming or rotational molding.

As illustrated in FIG. 2, the two halves 102, 104 of the ball 100 each exhibit a hollow, hemispherical shape. The first half 102 is formed by a wall 112 and, similarly, the second half 104 is formed by a second wall 114. The walls 112, 114 each terminate at rim 116, 118 wherein the rims 116, 118 meet with each other when the sphere halves 102, 104 are mated. For purposes of reference herein, each rim 116, 118 form an imaginary plane P1, P2.

The illustrated ball 100 includes a plurality of four mating fasteners for securing the two halves of the ball 100 together. However, from one to six mating fasteners may be present, for example, depending on the size of the ball may be present. In embodiments the mating fasteners are mechanical fasteners that are release-able or non-release-able, depending on the fastener and the degree of interference between the portions of fasteners. If the first and second portions of the fasteners exhibit a high degree of interference there may be less of a likelihood the fasteners may be released once mated together.

The mating fasteners include a first fastening portion 122 provided in the first half of the ball and a second fastening portion 124 provided in the second half of the ball. The first and second fastening portions 122, 124 interlock with each other to retain the ball halves together at the rims 116, 118. In embodiments, the first fastening portion 122 is connected to wall 112 and the second fastening portion 124 is connected to wall 114. The first fastening portions 122 are spaced away from the internal surface of wall 112 and do not form a part of the external or internal wall 112 of the ball as discussed further below. In particular embodiments, both the first and second fastening portions may be spaced away from the wall of the first and second ball halves.

Figure 3:
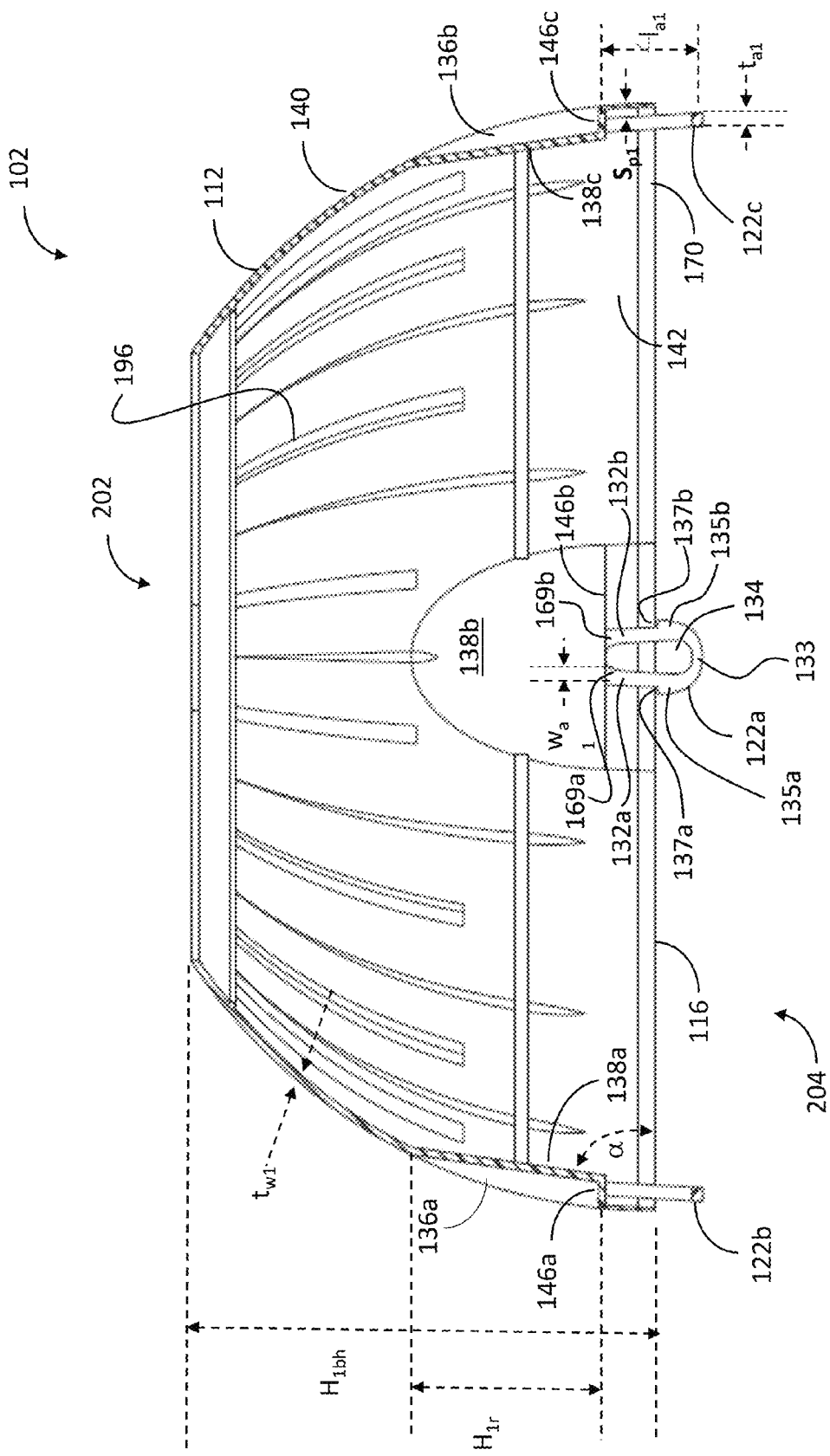
FIG. 3 illustrates a cross-sectional view of an embodiment of a first portion of an animal ball including a first portion of a mating fastener.

FIG. 3 illustrates a cross-sectional view through the first half 102 of the ball illustrating the first fastening portion 122a from the interior of the ball and cross-sections of the first fastening portion 122b, 122c from either side of the fastener. As noted above, the first fastening portion is spaced away from the wall 112 a distance $S_{p1}$, which may be in the range of 1 mm to 5 mm, including all values and ranges therein. As seen in the figure, the first fastening portions 122a, 122b, 122c (hereinafter referred to collectively as 122) each include two resilient arms 132a, 132b (see fastener 122a) (herein collectively referred to as 132) that are connected together at the ends 133 to form a unitary arch. Therefore, an opening 134 is formed between the arms 132. In alternative embodiments, the two resilient arms may be separated at the ends or only a single resilient arm may be present. The arms 132 may deflect inwards and towards each other when the first portion of the mating faster is inserted into the second fastening portion of the mating faster. Near the ends 133 of the resilient arms, the resilient arms include angled surfaces 135a, 135b (herein after 135) and shoulders 137a, 137b (hereinafter 137), which exhibit a greater width than the remainder of the resilient arms 132. The resilient arms may be formed of the same material as the wall 112 of the ball half 102, or from a different material.

The thickness of the wall 112 $t_{w1}$ of the first ball half 102 may be in the range of 2 mm to 5 mm, including all values and ranges therein. The resilient arms may individually have a thickness $t_{a1}$ in the range of 1 mm to 5 mm, including all values and ranges therein. The resilient arms, near the base of the arms where arms are connected to the ball, may also individually have a width $w_{a1}$ in the range of 1 mm to 5 mm, including all values and ranges therein. Again, the width of the shoulder portion of each resilient arm is greater than the width of the base portion of the resilient arms, and may be in the range of 2 mm to 7 mm, including all values and ranges therein. At the ends 133, the width of the resilient arm may be the same or less than that of the resilient arms near the base of the arms 19a, 139b, again being in the range of 1 mm to 5 mm, including all values and ranges therein. Further, the resilient arms have a length $l_{a1}$ in the range of 10 mm to 30 mm including all values and ranges therein.

A plurality of four recesses 136a, 136b (hereinafter 136) are formed in the exterior surfaces 140 of the wall 112 of the first half 102 of the ball 100 (two of the recesses being illustrated in FIG. 3 and three are seen in FIG. 2). The recesses are illustrated as being oblong, assuming the shape of half an ellipse. However, the recesses may exhibit other geometries as well, including half circle, triangular, or rectangular geometries. The recesses may individually extend from one third to three quarters of the height $H_{1bh}$ of the ball half 102, 104, including all values and ranges therein. That is, the individual recesses may exhibit the same height or different heights. Further, the recesses may extend at an angle α to the rim (and the plane formed by the rim) in the range of 45 to 90 degrees including all values and ranges therein, and preferably from 80 to 90 degrees. The recesses 136 form protrusions 138a, 138b, 138c (hereinafter 138) that extend from the interior surfaces 142 of the wall 112. In alternative embodiments, a single recess may be present or two recess, three recess, five recesses, etc., may be present around the circumference of the ball relative to the rim 116.

The recesses each terminate near the rim 116 in a ledge 146a, 146b, 146c (hereinafter 146), which extends to the exterior wall 140 and parallel to the rim 116, or at an angle of +/−1 to 30 degrees relative to the plane formed by the rim 116 (see P1, FIG. 2). The ledges, therefore, provide a surface area to grasp when mating the ball halves 102, 104 together that is perpendicular or nearly perpendicular to the direction of mating. The first fastening portions 122 extend from the ledges 146 toward the second half of the ball 104. In embodiments, the first fastening portions extend perpendicular to the ledges. Therefore, as noted above, the first portion of the fasteners 122 are connected to but spaced from the walls 102, 104 a distance $S_{p1}$.

Figure 4:
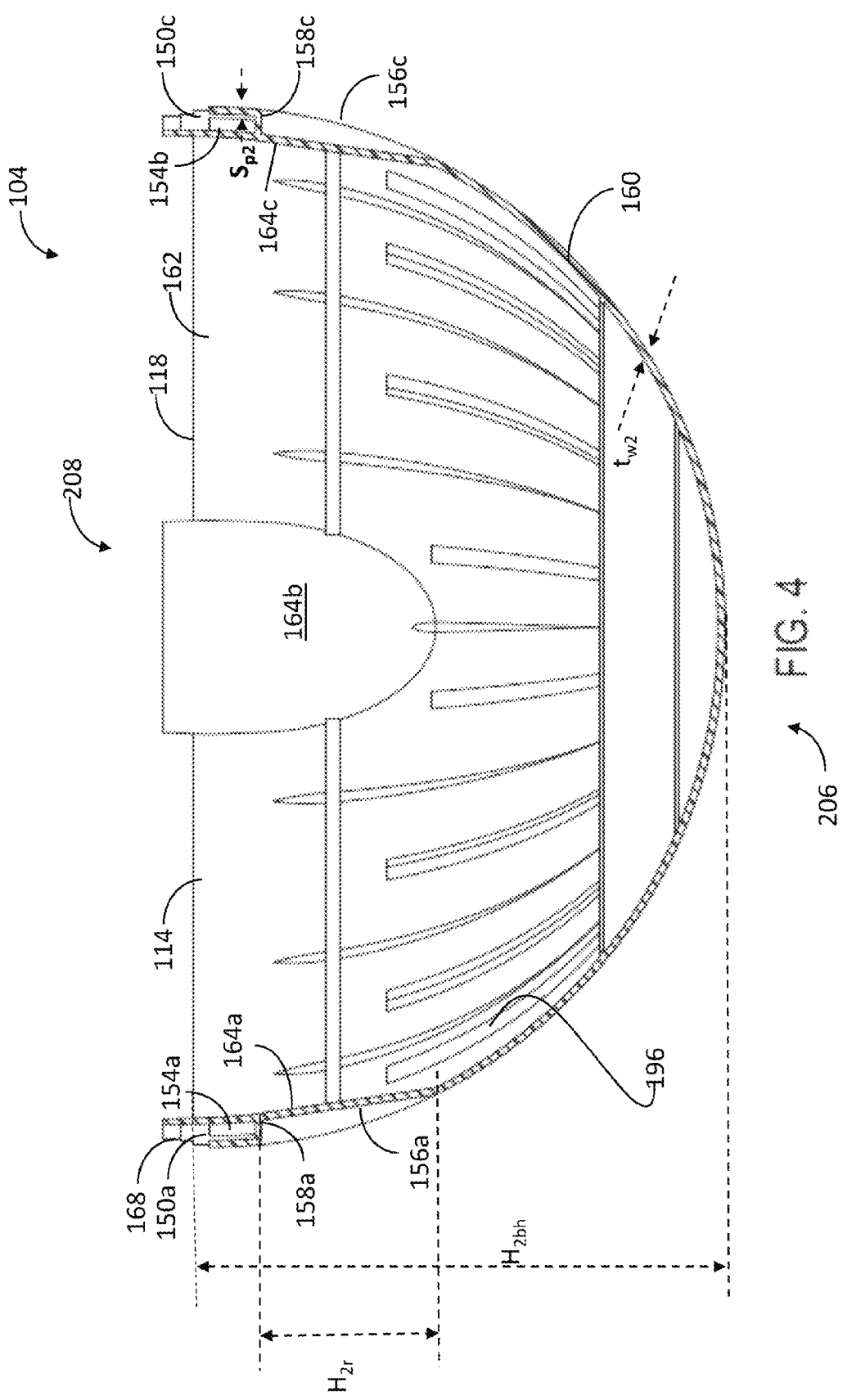
FIG. 4 illustrates a cross-sectional view of an embodiment of a second portion of an animal ball including a second portion of a mating fastener.
Figure 5:
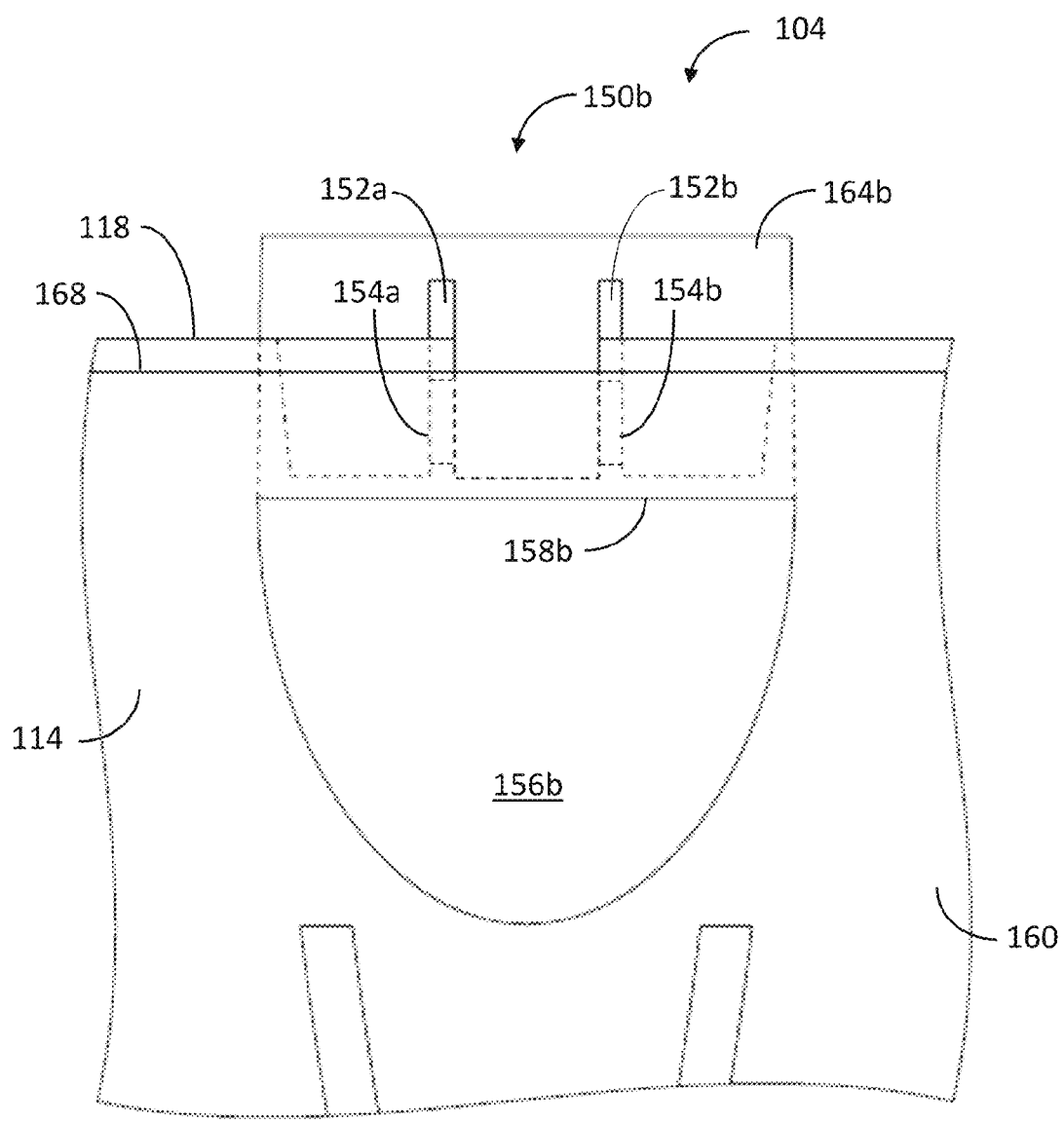
FIG. 5 illustrates a close up view of an embodiment of a second portion of an animal ball in the region of the second portion of a mating fastener as seen from the exterior of the ball; wherein the fastener is illustrated in dotted line format behind the wall of the ball.

FIG. 4 illustrates a cross-sectional view through the second half 104 of the ball. Cross-sectional views of the second fastening portions 150a, 150c on either side of the ball are seen and FIG. 5 illustrates a close up view of a second fastening portion 150b as seen from the exterior of the ball, wherein the portion of the fastener behind the wall is illustrated in dotted lines (the second fastening portion being referred to collectively as 150). As seen, particularly in FIG. 5, the second fastening portions include guide arms 152a, 152b (hereafter referred to collectively as 152). A first fastening portion is inserted between the guide arms, which causes the arms of the fastener to deform or compress due to interference between the first fastening portion and the guide arms. Each guide arm includes an opening 154a, 154b for (hereinafter referred to collectively as 154) receiving and retaining the angled surfaces 135a, 135b and shoulders 137a, 137b of the resilient arms 132. The openings 154a, 154b are spaced from the wall a distance $S_{p2}$ (as seen in FIG. 4, with reference to 150b) and again the second portion of the fasteners 150a, 150c are connected to but are spaced from the walls 114. In addition, as the openings may extend through the guide arms, it may be possible to release the ball halves by deforming the resilient arms through the openings and releasing the first half of the ball from the second half of a ball using a tool configured to apply pressure to the resilient arms through the openings 154.

Similar to the first half 102, the thickness $t_{w2}$ of the second wall 114 is in the range of 2 mm to 5 mm, including all values and ranges therein. The second half 104 also includes a plurality of recesses 156a, 156b, 156c (herein after referred to collectively as 156) in the exterior 160 of the wall 114. FIG. 4 illustrates two of the recesses and four are illustrated in FIG. 2. The recesses 156 terminate near the rim of the ball 118 in ledges 158a, 158b, 158c (herein after referred to collectively as 158). The ledges 158 extend parallel to the rim 118 and the second fastening portions extend from the ledges 158, opposite from the recesses 156, toward the first half of the ball 102. The ledges 158 on the second portion of the ball also form surfaces that are parallel or substantially parallel, being with +/−1 to 30 degrees relative to the rim and P2 (see FIG. 2). The ledges may therefore also be perpendicular or nearly perpendicular to the direction of mating the ball, providing a surface against which force may be applied to mate the two ball halves.

The recesses 156 form or create protrusions 164a, 164b, 164c within the interior surface 162 of the wall 114. Unlike the first half of the ball 102, where the protrusions 138 end at the ledges 146, in the second half of the ball 104, the protrusions 164a, 164b, 164c extend past the ledges 158 and, in embodiments, past the rim 118. Thus, when the two halves 102, 104 of the ball are mated, the protrusions 138 of the first half 102 of the ball meet the protrusions 164 of the second half 104 of the ball, which covers the mating fasteners and shields the mating fasteners from the interior volume of the ball and any animals that maybe secured therein.

Furthermore, the wall 114 of the second half of the ball may include a lip 168 around the wall 114 of the ball adjacent to the rim 118. The lip 168 may exhibit a reduced thickness as compared to the thickness of the wall 114. The lip may be inserted between the first mating faster 122 and the wall 112 $t_{w2}$ of the first half near the rim 116 of the first half. Further, the first half 102 may also include a lip 170 having a reduced thickness as compared to the thickness $t_{w1}$ of the first wall 112, which overlaps the lip 168 of the second half 104, when the halves of the ball are mated.

Returning again to FIG. 2, the ball 100 includes an access opening 176 allowing for the animal to be placed into and removed from the animal ball 100. As illustrated, an access opening 176 is defined in the first half 102 of the ball 100; however, the access opening may alternatively be positioned in the second half 102 or spanning between the first and second halves. A lid 106 is provided that mates with the access opening 176 and may be locked in place to prevent an animal that is secured inside from escaping.

Figure 6:
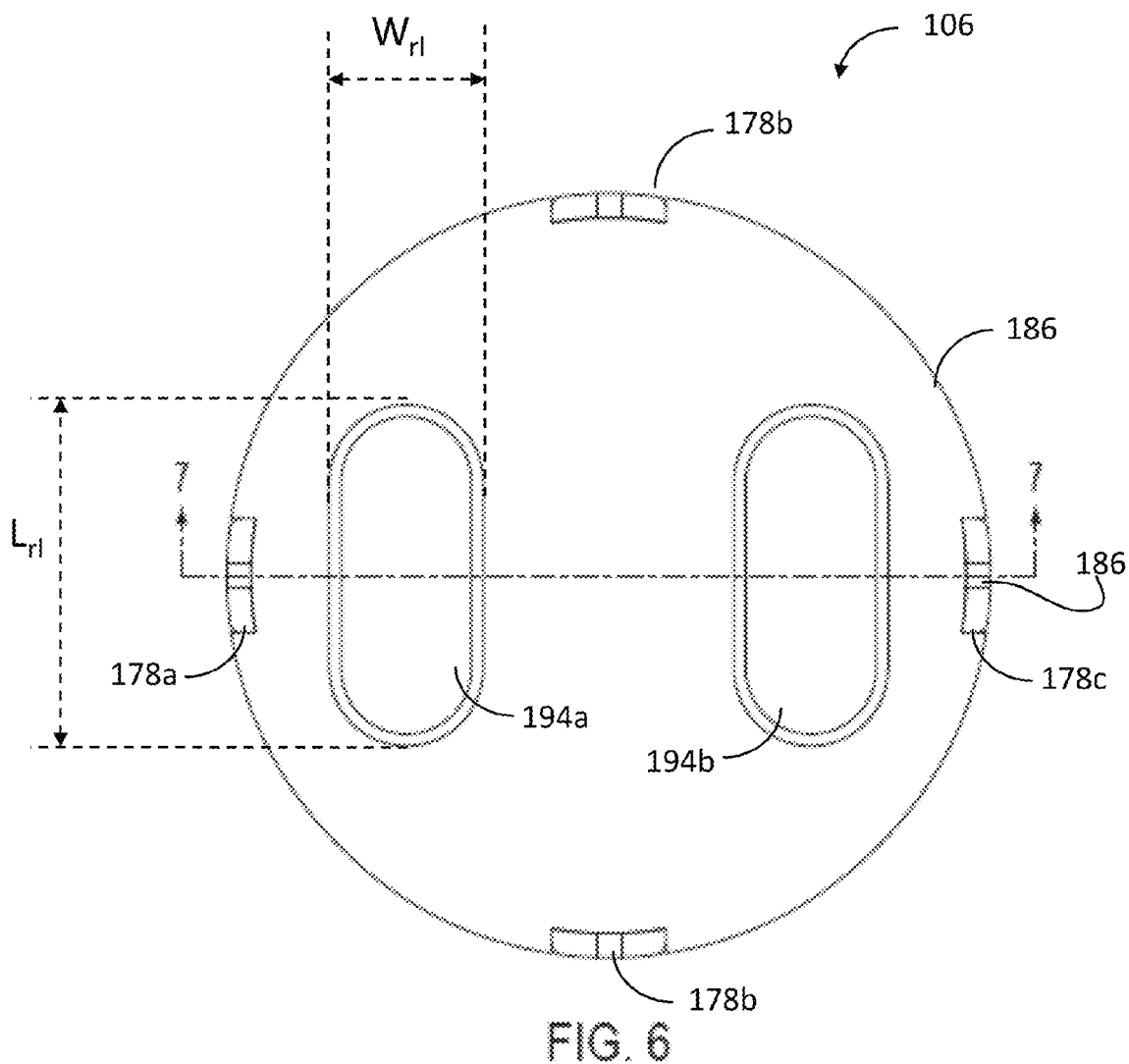
FIG. 6 illustrates an embodiment of a top view of a lid.
Figure 7:
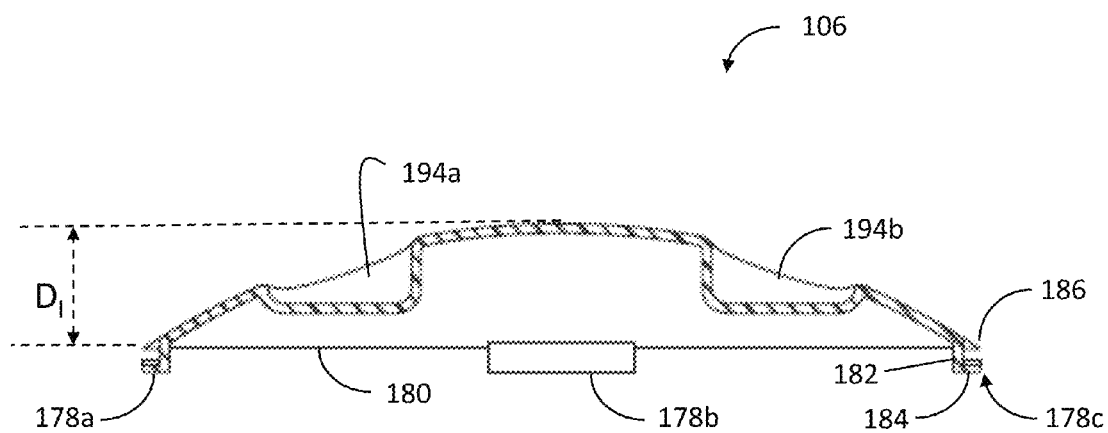
FIG. 7 illustrates a cross-sectional view of the lid of FIG. 6 taken at line 7-7.

As seen in FIGS. 6 and 7, the lid 106 includes a plurality of four finger-like brackets 178a, 178b, 178c, 178d (hereafter collectively 178). Alternatively, a single bracket may be provided or two, three, five, or more brackets depending on the size of the ball. The brackets 178 each include an L-shaped bracket. A first leg 182 of the bracket extends down from the lid at a point inward from the edge 186 of the rim 180 and a second leg 184 of the bracket extends parallel to the rim 180. The second leg may extend out to the edge 186 of the lid or past the edge 186 of the lid.

One or more channel openings 188a, 188b, 188c, 188d (four as illustrated in FIG. 2) are provided in the wall 112 of the first ball half through which the brackets are passed when the lid 106 is mounted on the ball 100. The lid is then rotated and the wall 112 becomes captured between the bracket 178 and the lid 106. Holding the lid to the ball and covering the access opening 176. In embodiments, the portion of the wall, or lip, 190a 190b, 190c, 190d (referred to collectively as 190), which becomes captured between the bracket 178 and the lid 106, has a reduced thickness as compared to the remainder of the wall. The lip 190 may extend from the exterior or interior surface of the wall 112 and breaks in the lip 190 forms the channel openings 188 for receiving the brackets.

In particular embodiments, the second leg of the bracket 184 includes a stepped surface, wherein a portion 192 of the second leg is thicker than the rest of the parallel portion of the bracket. The thicker portion of the leg may extend along a third to one half of the bracket and may be centered in the middle of the second leg as illustrated. Depending on its thickness, the thicker portion of the second leg may stop against the lip 190 when the lid is rotated or the thicker portion may catch under the lip and prevent the lid from rotating back around.

The lid also includes two recesses 194a, 194b to facilitate rotating the lid relative to the ball 100. The two recesses extend parallel to each other. However, only a single recess may be present, or the recesses may be angled relative towards each other. The recesses may extend at least a third of the depth $D_1$ of the lid from the top of the lid, wherein the depth spans from the top of the lid 106 to the rim 180, and preferably at least a half of the depth of the lid. The width $w_{r1}$ of each recess 194 may be one quarter to one third of the diameter of the lid and the length of each recess $L_{r1}$ may be three quarters of the diameter of the lid or less, such as between one third and three quarters of the diameter of the lid.

In addition, a number of elongated openings 196 may be provided around the animal ball. The elongated openings may be present in the first half of the ball 102, the second half of the ball 104 or in both halves of the ball. Each elongated opening may extend from the top of each half 202, 206 to the bottom of each half 204, 208 at the rim 116, 118. Further the elongated openings may be positioned around circumference of each relative to the rim 116, 118. The elongated openings have a thickness in the range of 1 mm to 5 mm, including all values and ranges therein. The elongated openings may exhibit the same thickness along the entire opening or the openings may transition in thickness from the top of each half 202, 206 to the rim of each half 116, 118. The elongated opening may extend along one quarter to three quarters of the length of the surface from the top of each ball half to the rim of each ball half.

Figure 8A:
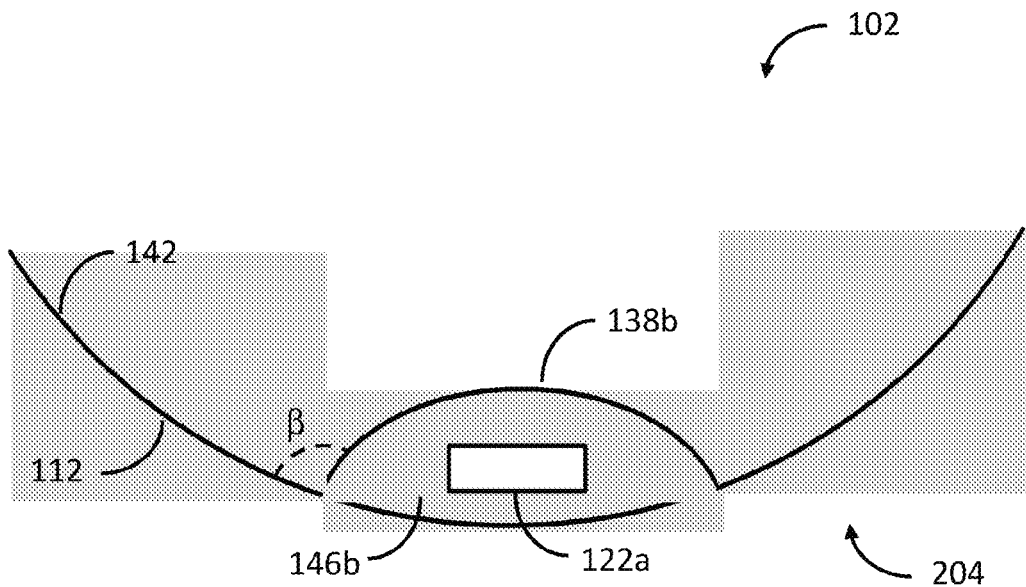
FIG. 8a illustrates a close up of a bottom up view of an embodiment of a protrusion as it meets an interior wall in the first half of the ball.
Figure 8B:
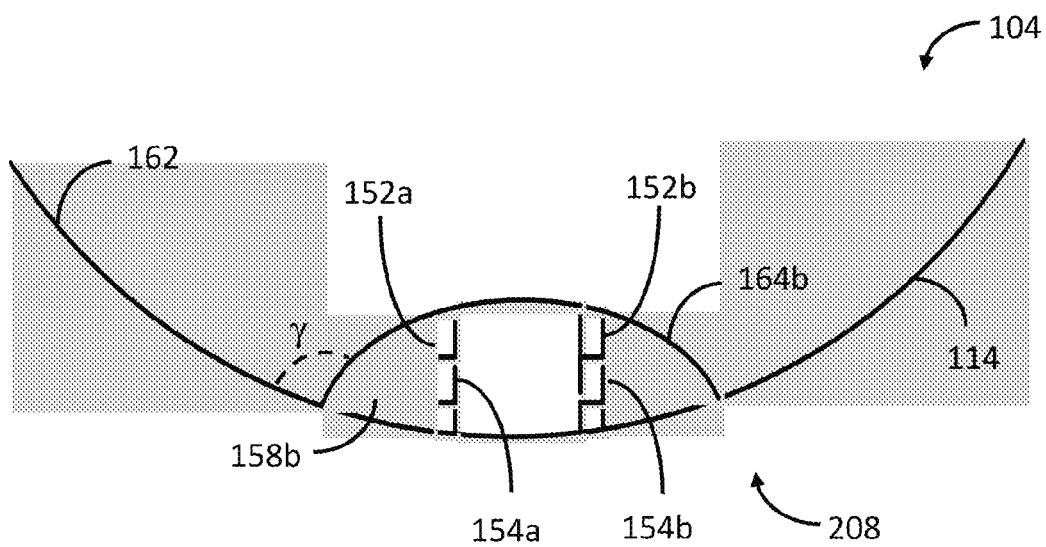
FIG. 8b illustrates a close up view of a top down view of an embodiment of a protrusion as it meets an interior wall in the second half of the ball.

Further, FIG. 8a illustrates a top down view of an embodiment of a protrusion 138b as it meets the interior wall 142 of the first half 102 of the ball. As illustrated, the protrusion 138b meets the wall 112 on either side of the protrusion, wherein angle β is greater than 90 degrees, such as in the range of 90 degrees to 160 degrees, including all values and ranges therein, and preferably from 110 to 145 degrees. As seen in FIG. 8b, the protrusions 164b of the second half 104 of the ball may exhibit a similar configuration, wherein the protrusions meet the interior wall 162 on either side of the protrusion at an angle γ that is greater than 90 degrees, such as in the range of 90 degrees to 160 degrees, including all values and ranges therein, and preferably from 110 to 145 degrees.

Thus, in embodiments, a method of forming the ball may include forming a hollow sphere by forming the sphere halves as well as the lid. As noted above, the balls halves and lid may be formed by injection molding, thermoforming, vacuum forming, or other processes depending on the material selected. The ball halves may be assembled by mating the first and second half of the ball with the mating fasteners. The ledges may assist in securing the halves together by hand or by machine. In mating the portions of the fastener, the protrusions on the interior walls of the ball align. Further, when the portions of the fasteners are mated, the first protrusion and second protrusion may meet, covering the fasteners under the second protrusion, which extends past the ledges in the second half of the ball.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. An animal ball, comprising:
  a hollow sphere including a first half and a second half mate-able with said first half via a mating fastener comprising a first fastening portion and a second fastening portion, wherein:
  said first half includes a first wall having a first exterior surface, a first interior surface, a first rim, said first fastening portion, and a first recess in said first exterior surface;
  the first recess comprises a first ledge;
  a first interior protrusion, defined at least in part by the first recess, extends from the first interior surface towards said first rim but not past the first ledge;
  said first fastening portion extends from a surface of said first ledge and is spaced away from the first interior surface;
  said second half includes a second wall having a second exterior surface, a second interior surface, a second rim, said second fastening portion, and a second recess in said second exterior surface;
  the second recess comprising a second ledge;
  a second interior protrusion, defined at least in part by the second recess, extends from the second interior surface, past the second ledge, and past the second rim;
  the second fastening portion extends from a surface of the second ledge and past the second rim;
  said first and second fastening portions are configured to be releasably engaged with one another such that said first half and second half form said hollow sphere; and
  when said first and second fastening portions are engaged with one another:
    an end of said second interior protrusion abuts an end of said first interior protrusion so as to shield said first and second fastening portions from an internal surface of said hollow sphere; and
    the first and second fastening portions do not form any portion of the first and second exterior surfaces.

2. The animal ball of claim 1, wherein the first ledge extends from said first recess to said first wall and is parallel to said first rim and said second ledge extends from said second recess to said second wall and is parallel to said second rim.

3. The animal ball of claim 1, wherein said second interior protrusion comprises an inner surface that defines at least a portion of said internal surface of said hollow sphere.

4. The animal ball of claim 1, wherein said first fastening portion includes a resilient arm and said second fastening portion includes an opening for receiving said resilient arm.

5. The animal ball of claim 1, further comprising an access opening defined in at least one of said first half and said second half, and a lid mate-able with said access opening.

6. The animal ball of claim 5, wherein said first wall includes a lip protruding from said first wall at said access opening, wherein said lip has a thickness that is the same or less than the thickness of said first wall and said lid includes a bracket that slides under said lip.

7. The animal ball of claim 1, further comprising a plurality of elongated slits formed in at least one of said first wall and said second wall.

8. The animal ball of claim 1, wherein said first interior protrusion meets the first interior surface at an angle that is greater than 90 degrees and said second interior protrusion meets the second interior surface at an angle that is greater than 90 degrees.

9. The animal ball of claim 1, further comprising a plurality of said first recesses forming a plurality of said first interior protrusions, a plurality of said second recesses forming a plurality of said second interior protrusions, and a plurality of said mating fasteners, wherein said plurality of first and second recesses and said plurality of mating fasteners are spaced around said first and second halves.

10. A method of assembling an animal ball, comprising:
  forming a hollow sphere including a first half and a second half mate-able with said first half via a mating fastener comprising a first fastening portion and a second fastening portion, wherein:
  said first half includes a first wall having a first exterior surface, a first interior surface, a first rim, said first fastening portion, and a first recess in said first exterior surface;
  the first recess comprises a first ledge;
  a first interior protrusion, defined at least in part by the first recess, extends from the first interior surface towards said first rim but does not extend past the first ledge;
  said first fastening portion extends from a surface of said first ledge and is spaced away from the first interior surface;
  said second half includes a second wall having a second exterior surface, a second interior surface, a second rim, said second fastening portion, and a second recess in said second exterior surface;
  the second recess comprises a second ledge;
  a second interior protrusion, defined at least in part by the second recess, extends from the second interior surface, past the second ledge, and past the second rim;

the second fastening portion extends from a surface of the second ledge and past the second rim;

forming said hollow sphere comprises releasably engaging the first and second fastening portions with one another such that:

said first and second halves form said hollow sphere;

an end of said second interior protrusion extends past said first rim to abut an end of said first interior protrusion, thereby shielding the first and second fastening portions from an internal surface of said first half and said second half of said hollow sphere; and the first and second fastening portions do not form any portion of the first and second exterior surfaces.

11. The method of claim 10, wherein:

said first ledge extends from said first recess to said first wall and is parallel to said first rim and said second ledge extends from said second recess to said second wall and is parallel to said second rim; and the method further comprises mating said first half and second half at least in part by applying pressure against said first and second ledge.

12. The method of claim 10 wherein said second interior protrusion comprises an inner surface that defines at least a portion of said internal surface of said hollow sphere.

13. The method of claim 10, wherein at least one of said first half and said second half includes an access opening and said method further comprises forming a lid; and mating said lid with said access opening.

* * * * *